United States Patent [19]

Mossman et al.

[11] Patent Number: 5,331,082

[45] Date of Patent: Jul. 19, 1994

[54] PROCESS FOR MANUFACTURE OF HIGH MOLECULAR WEIGHT POLYESTER RESINS FROM 2,6-NAPHTHALENE DICARBOXYLIC ACID

[75] Inventors: Allen B. Mossman, Wheaton; John A. Macek, Naperville; Lawrence G. Packer, Lisle, all of Ill.

[73] Assignee: Amoco Corporation, Chicago, Ill.

[21] Appl. No.: 78,680

[22] Filed: Jun. 16, 1993

[51] Int. Cl.$^5$ .............................................. C08G 63/18
[52] U.S. Cl. .................................. 528/298; 528/272; 528/308; 528/503
[58] Field of Search ................ 528/272, 298, 308, 503

[56] References Cited

U.S. PATENT DOCUMENTS

| | | | |
|---|---|---|---|
| 3,496,220 | 2/1970 | McCarty et al. | 560/91 |
| 4,026,973 | 5/1977 | Shima et al. | 264/235 |
| 4,963,644 | 10/1990 | Duh | 528/272 |
| 4,966,269 | 2/1991 | Richeson et al. | 525/444 |
| 5,006,613 | 4/1991 | Shepherd et al. | 525/444 |
| 5,069,944 | 12/1991 | Yamagishi et al. | 427/444 |
| 5,204,418 | 4/1993 | Yasue et al. | 525/445 |
| 5,250,497 | 10/1993 | Fujimura et al. | 503/227 |

*Primary Examiner*—Samuel A. Acquah
*Attorney, Agent, or Firm*—Thomas E. Nemo; Wallace L. Oliver

[57] ABSTRACT

High quality linear polyester resin is prepared by reacting in a first step or zone 2,6-naphthalene dicarboxylic acid with a molten prepolymer derived from a glycol and 2,6-naphthalene dicarboxylic acid to form a low molecular weight product of the first step or zone; reacting this resultant product with a glycol in at least two successive steps or zones of glycol addition to form prepolymer; and polymerizing at least a portion of the resulting prepolymer to form polyester resin which exhibits midpoint glass transition temperatures above about 123° C. The resulting prepolymer is particularly suitable for reaction with the 2,6-naphthalene dicarboxylic acid in the first step or zone. Advantageously, at least a portion of the prepolymer is, therefore, returned to the first step or zone.

20 Claims, No Drawings

PROCESS FOR MANUFACTURE OF HIGH MOLECULAR WEIGHT POLYESTER RESINS FROM 2,6-NAPHTHALENE DICARBOXYLIC ACID

FIELD OF THE INVENTION

This invention relates to a process for production of high molecular weight polyester resins from 2,6-naphthalene dicarboxylic acid. More particularly, the invention relates to a process for manufacture of high quality polyester resin exhibiting improved thermal properties. In one specific aspect, this invention relates to a process of reacting in a first step or zone 2,6-naphthalene dicarboxylic acid with a molten prepolymer derived from a glycol and 2,6-naphthalene dicarboxylic acid to form a low molecular weight effluent of the first step or zone; subsequently reacting the resultant effluent with a glycol in at least two successive steps or zones to form prepolymer; and then polymerizing at least a portion of the resulting prepolymer to form polyester resin which exhibits midpoint glass transition temperatures above about 123° C. The resulting prepolymer is particularly suitable for reaction with the 2,6-naphthalene dicarboxylic acid in the first step or zone. Advantageously, at least a portion of the prepolymer is, therefore, returned to the first step or zone.

BACKGROUND OF THE INVENTION

In preparing linear polyesters such as polyethylene terephthalate, a prepolymer consisting of bis(2-hydroxyethyl) terephthalate and/or higher ethylene terephthalate oligomers is polycondensed under vacuum to remove glycol liberated as prepolymer is condensed. The bis-(hydroxy-ethyl) terephthalate is usually prepared by either transesterification of dimethyl terephthalate with ethylene glycol or by direct esterification of highly purified terephthalic acid with excess ethylene glycol at the normal boiling point of the glycol.

U.S. Pat. No. 3,496,220 describes an esterification process in which hydroxyl-ended oligomer, said to be suitable for polycondensation to high molecular weight linear polyesters, is prepared by reacting terephthalic acid with performed hydroxyl-ended oligomer to from a carboxyl-ended oligomer which is then reacted with glycol in successive reaction zones to obtain the hydroxyl-ended oligomer. While it is stated that succinic, pimelic, adipic cyclohexane dicarboxylic, diphenyl dicarboxylic, and isophthalic acid might be used, this esterification process is illustrated only by means of embodiments utilizing the reaction of terephthalic acid with ethylene glycol and formation of the resulting hydroxyl-ended oligomer. No polycondensation of any oligomer is reported.

U.K. Patent Specification No. 1,445,034 describes a process for continuous production of polyester from purified terephthalic acid which polyester is said to have a molecular weight range of 17,500 to 18,500. In this process a slurry of terephthalic acid and excess of ethylene glycol (1.4 mole ratio) along with a conventional esterification catalyst is to be fed into a heated first reactor continuously. Introduction of excess glycol later in the esterification by additional ethylene glycol injection into process streams between successive reactors is said to facilitate completion of esterification.

J. S. Chung in "Acid-Base and Catalytic Properties of Metal Compounds in the Preparation of Poly(ethylene terephthalate)" *J. Macromol. Sci.-Chem.*, A27(4), pp. 479-490 (1990), describes catalytic activity of metal complexes for both transesterification of dimethyl terephthalate and polycondensation of bis(2-hydroxyethyl) terephthalate. Chung reports that some metal ions showing higher activity in the polycondensation reaction also catalyze side reactions which can cause discoloration of the final poly(ethylene terephthalate) polymer. For many commercial uses, such as films and fibers, color is, however, a critical property of poly(ethylene terephthalate) resins.

Preparation of high molecular weight poly(ethylene terephthalate) by means of procedures used for the preparation of polyethylene terephthalate by either transesterification of dimethyl terephthalate with ethylene glycol or by direct esterification of highly purified terephthalic acid fail to produce resins with thermal properties required in applications of commercial interest.

Preparation of poly(ethylene-2,6-naphthalate) from 2,6-naphthalene dicarboxylic acid has, for example, been plagued with problems. These problems are, to a great extent, due to the insolubility of 2,6-naphthalene dicarboxylic acid, the small particle size of 2,6-naphthalene dicarboxylic acid generally available, and a molecular weight of 2,6-naphthalene dicarboxylic acid which is greater than the molecular weight of terephthalic acid. These factors serve to limit the minimum mole ratio of ethylene glycol to 2,6-naphthalene dicarboxylic acid ratio to values greater than two. Under these conditions substantial oligomerization of ethylene glycol occurs in the esterification stage of the preparation. Oligomerization results in a diglycol ether by-product which becomes incorporated into the polyester chain lowering its melting point and generally adversely affecting other properties of the resultant polymer. There is, therefore, a need for and improved process for manufacture from 2,6-naphthalene dicarboxylic acid of high quality polyester resin exhibiting improved thermal properties.

SUMMARY OF THE INVENTION

In one aspect, this invention is a process of preparing a high quality linear polyester resin which comprises reacting in a first step or zone 2,6-naphthalene dicarboxylic acid with a molten prepolymer derived from a glycol and 2,6-naphthalene dicarboxylic acid to form a low molecular weight product of the first step or zone; reacting the resultant product with a glycol in at least two successive steps or zones of glycol addition to form prepolymer; and polymerizing at least a portion of the resulting prepolymer to form polyester resin which exhibits midpoint glass transition temperatures above about 123° C. Typically, at least a portion of an effluent form one or more of the steps or zones of glycol addition and/or the prepolymer is returned to the first step or zone.

While prepolymer may be formed in the presence of a catalyst and/or ether suppressant, in preparing high quality linear polyester resin according to this invention the prepolymer is, advantageously, formed in a substantial absence of catalyst and/or ether suppressant.

In another aspect, this inventions a process of preparing a high quality linear polyester resin which comprises: (A) reacting in a first step or zone 2,6-naphthalene dicarboxylic acid with a molten hydroxyl-ended prepolymer derived from a glycol and 2,6-naphthalene dicarboxylic acid at temperatures in a range of from about 190° C. to about 320° C. to form a resulting carboxyl-ended prepolymer; (B) reacting the carboxyl-ended prepolymer with a glycol in at least two successive steps or zones at temperatures in a range of from about 180° C. to about 330° C. to form a hydroxyl-ended prepolymer; (C) partitioning the resulting hydroxyl-ended prepolymer into a condensation fraction and at least one recycle fraction of the hydroxyl-ended prepolymer; (D) returning one of the recycle fractions of hydroxyl-ended prepolymer to the first step or zone; and (E) polymerizing in a polycondensation step or zone at least a portion of the condensation fraction of hydroxyl-ended prepolymer to form polyester resin which exhibits midpoint glass transition temperatures above about 123° C., preferably in a range from about 123° C. to about 126° C. and even higher.

In other embodiments of the processes for preparing high quality linear polyester resins according this invention the amount of recycle fraction of hydroxyl-ended prepolymer returned to the first step or zone is in a range of from about 5 percent to up to about 95 percent, preferably from about 15 percent to up to about 75 percent, more preferably from about 25 percent to up to about 55 percent of the sum of the condensation fraction and all recycle fractions of hydroxyl-ended prepolymer.

In preferred embodiments of the processes for preparing high quality linear polyester resin according to this invention further comprising recovering unreacted glycol from at least a portion of the condensation fraction of hydroxyl-ended prepolymer prior to the polycondensation step or zone. For example, the condensation fraction of hydroxyl-ended prepolymer may be subjected to a flash separation to remove unreacted glycol prior to polycondensation.

In another aspect, this inventions a process of preparing a high quality linear polyester resin which comprises; (A) reacting in a first step or zone about 10 parts by weight of 2,6-naphthalene dicarboxylic acid with from about 1 part to about 100 parts by weight of a molten hydroxyl-ended prepolymer derived from 2,6-naphthalene dicarboxylic acid and a glycol to form a resulting product comprising acid modified prepolymer; (B) reacting in at least two successive steps or zones the acid modified prepolymer of the first step or zone with the glycol to form a product comprising hydroxyl-ended prepolymer; (C) partitioning the resulting prepolymer into a condensation fraction and a recycle fraction of the hydroxyl-ended prepolymer; (D) returning the recycle fraction to the first step or zone; and (E) polymerizing in a polycondensation step or zone the condensation fraction of hydroxyl-ended prepolymer to form polyester resin which exhibits midpoint glass transition temperatures above about 124° C., preferably in a range from about 124° C. to about 126° C. and even higher.

In preferred embodiments of the processes for preparing high quality linear polyester resins according this invention the total amounts of glycol used to form the hydroxyl-ended prepolymer provide in a range of from about 1 to about 10 moles of glycol per mole of 2,6-naphthalene dicarboxylic acid.

In preferred embodiments of the processes for preparing high quality linear polyester resins according this invention the amount of recycle fraction of hydroxyl-ended prepolymer returned to first step or zone is in a range of from about 25 percent to up to about 55 percent of the sum of the condensation fraction and recycle fraction of hydroxyl-ended prepolymer.

BRIEF DESCRIPTION OF THE INVENTION

Prepolymers useful in the processes of this invention for preparing high quality linear polyester resins are suitably prepared by direct esterification of highly purified 2,6-naphthalene dicarboxylic acid (NDA) with a stoichiometric excess of a preselected glycol at the normal boiling point of the glycol and/or higher temperatures. Heating of the reactants under pressure at temperatures above the normal boiling point of the glycol has been discovered to lower the time required for esterification.

Direct esterification of NDA is, advantageously, carried out in the presence of low levels of unreacted glycol which control formation of diglycol ether. Any diglycol ether which becomes incorporated into the polyester chain is believed to lower its melting point and generally adversely affect other properties of the polyester resin. Use of a low glycol to acid ratio has been found to reduce the amount of diglycol ether formed during direct esterification. Also, addition of inorganic alkalis, various salts and other materials has been found to further inhibit ether formation. In general, conventional esterification catalyst, such as antimony, arsenic, titanium, tin, and/or bismuth, may be used.

The present invention is a novel process of preparing a high quality linear polyester resin which includes reacting in a first step or zone 2,6-naphthalene dicarboxylic acid with a molten prepolymer which has been derived from a glycol and 2,6-naphthalene dicarboxylic acid to form a low molecular weight product of the first step or zone. Reacting the resultant product of the first step or zone with a glycol in at least two successive steps or zones of glycol addition to form prepolymer suitable for both reacting in a first step or zone with 2,6-naphthalene dicarboxylic acid, and polymerizing in a polycondensation step or zone to form polyester resin which exhibits midpoint glass transition temperatures above about 123° C., preferably in a range from about 124° C. to about 126° C. and even higher.

Molten prepolymer useful in the first step or zone may contain unreacted glycol up to at levels at which the amounts of diglycol ether formed in processes according to this invention are deleterious to quality of polyester resin product. Such levels of unreacted glycol, expressed as a ratio of moles of glycol to moles of 2,6-naphthalene dicarboxylic acid reacted in the first stage or zone, are in a range downward from about 5, preferably downward from about 1, more preferably in a range from about 0 to about 0.5, and most preferably from about 0 to about 0.15, moles of unreacted glycol to moles of 2,6-naphthalene dicarboxylic acid reacted in the first stage or zone.

Processes of preparing high quality linear polyester resin according to the present invention have no theoretical upper limit to the number of the steps or zones of glycol addition. The step of glycol addition may be carried out with continuous glycol addition in a semi-continuous process. In the process of preparing high quality linear polyester resin according to the present invention a portion of effluent form one or more of the steps or zones of glycol addition may be, advantageously, returned a prior step or zone and/or to the first step or zone.

Generally, the prepolymer is formed at temperatures in a range of from about 190° C. to about 320° C. Suitable temperatures employed will depend upon well known factors of process design, glycol used, and desired product properties. After esterification is substantially completed, prepolymer is polymerized in a polycondensation step or zone. This polymerization, consisting essentially of transesterification, involves, typically, high vacuums and temperatures ranging from about 250° C. to 350° C., or higher, to obtain a degree of polymerization as determined by end usage requirements, typically, a degree of polymerization of at least 70. Suitable process conditions are easily determined by one skilled in the art without undue experimentation.

Suitable glycols include any polyhydric alcohol, i.e. those having two or more OH groups per molecule, which form high molecular weight polyester resins from 2,6-naphthalene dicarboxylic acid, such as polymethylene glycols containing from 2 to about 10 carbon atoms, preferably the series of dihydric alcohols beginning with ethanediol, propanediol, butanediol, methylbutanediol, and the like. In the process for preparing high quality linear polyester resin according to the present invention, the prepolymer is, preferably, formed from at least one glycol selected from the group consisting of 1,2-ethanediol and 1,4-butanediol at temperatures in a range of from about 200° C. to about 300° C. More preferably, in the process of the present invention the glycol is 1,2-ethanediol and the poly(ethylene-2,6-naphthalate) resin formed exhibits midpoint glass transition temperatures in a range upward from about 124° C.

Generally, an amount of the recycle fraction of hydroxyl-ended prepolymer returned to the first step or zone is in a range of from about 15 percent to up to about 75 percent, preferably in a range of from about 25 percent to up to about 55 percent, of the sum of the condensation fraction and all recycle fractions of hydroxyl-ended prepolymer. However, any amount of hydroxyl-ended prepolymer returned to the first step or zone which is effective to improve quality of a linear polyester resin made form 2,6-naphthalene dicarboxylic acid may be used.

Processes of preparing a high quality linear polyester resin according to the present invention, typically, react about 10 parts by weight of 2,6-naphthalene dicarboxylic acid with from about 1 part to about 100 parts, preferably from about 2 parts to about 25 parts, and more preferably from about 5 parts to about 15 parts, by weight of a molten hydroxyl-ended prepolymer to form a resulting product comprising acid modified prepolymer. Molten acid modified prepolymer is reacted with a glycol in a plurality of successive steps or zones at temperatures in a range of from about 180° C. to about 330° C. to form a hydroxyl-ended prepolymer. In total the amounts of glycol used to form the hydroxyl-ended prepolymer, expressed as a ratio of moles of glycol to moles of 2,6-naphthalene dicarboxylic acid, are in a range upward from about 1 to about 10, preferably from about 1 to about 2, more preferably from about 1.01 to about 1.5, and most preferably from about 1.02 to about 1.15, moles of glycol to moles of 2,6-naphthalene dicarboxylic acid.

The following examples are being presented to illustrate certain embodiments of the invention disclosed herein; however, they should not be construed as limiting the scope thereof.

EXAMPLE 1

A two liter reactor was charged with PEN prepolymer (450 g). The reactor was heated to 360° F. and maintained at that temperature until the prepolymer was melted. At which time the stirrer was activated and the reactor temperature increased to 470° F. With continued stirring NDA (450 g) was added in two portions of 225 g each via a purged addition hopper. The reactor was sealed, and pressurized to 30 psig. While maintaining the melt temperature at 500° F., ethylene glycol was fed to the reactor at a rate 180.9 grams per hour for a period of one hour. During the ethylene glycol feed cycle water began to distill from the reactor. The temperature and pressure of the reactor were maintained until the production of water halted as indicated by a reduction in column overhead temperature of greater than 4° F. Following this period the pressure of the reactor was reduced in a controlled manner to atmospheric pressure. The reactor was maintained at 500° F. for an additional 25 minutes at which time one half the contents of the reactor was discharged via the bottom port of the reactor. While maintaining the reactor temperature at 500° F. two additional NDA and EG feed cycles were performed. Following the third NDA-/ethylene glycol feed cycle polyphosphoric acid (0.186 g; 80 ppm P), and antimony (III) oxide (0.18 g; 167 ppm Sb) were added to the mixture. The reactor was re-sealed. The pressure was reduced by means of a ramping controller at the rate of 13.2 mm Hg/min. to an ultimate vacuum of to 0.50 torr. The melt temperature was simultaneously increased to 550° F. at a rate of 1 F°/min. The polymerization was maintained at these conditions until a torque target of 100 in.lbs was observed on the reactor stirrer at 10 RPM. The polymer was recovered by extruding a strand from the reactor and quenching in an ice water bath. The resulting polymer had the following properties: Tg=124.1° C., Tm 261.0° C., IV=0.58, L*=−1.98, b*=8.88.

EXAMPLE 2

A two liter reactor was charged with PEN prepolymer (450 g). The reactor was heated to 360° F. and maintained at that temperature. until the prepolymer was melted. At which time the stirrer was activated and the reactor temperature increased to 470° F. With continued stirring NDA (450 g) was added in two portions of 225 g each via a purged addition hopper. The reactor was sealed, and pressurized to 30 psig. While maintaining the melt temperature at 500° F., ethylene glycol was fed to the reactor at a rate 155.0 grams per hour for a period of one hour. During the ethylene glycol feed cycle water began to distill from the reactor. The temperature and pressure of the reactor were maintained until the production of water halted as indicated by a reduction in column overhead temperature of greater than 4° F. Following this period the pressure of the reactor was reduced in a controlled manner to atmospheric pressure. The reactor was maintained at 500° F. for an additional 25 minutes at which time one half the contents of the reactor was discharged via the bottom port of the reactor. While maintaining the reactor temperature at 500° F. two additional NDA and EG feed cycles were performed. Following the third NDA-/ethylene glycol feed cycle polyphosphoric acid (0.186 g; 80 ppm P), and antimony(III) oxide (0.18 g; 167 ppm Sb) were added to the mixture. The reactor was released. The pressure was reduced by means of a ramping controller at the rate of 13.2 mm Hg/min to an ultimate vacuum of to 0.50 torr. The melt temperature was simultaneously increased to 550° F. at a rate of 1 F°/min. The polymerization was maintained at these conditions until a torque target of 100 in.lbs was observed on the reactor stirrer at 10 RPM. The polymer was recovered by extruding a strand from the reactor and quenching in an ice water bath. The resulting polymer had the following properties: Tg=125.2° C., Tm 260.6° C., IV=0.51, L*=86.4, a*=−1.98, b*=8.87.

EXAMPLE 3

A two liter reactor was charged with PEN prepolymer (450 g). The reactor was heated to 360° F. and maintained at that temperature until the prepolymer was melted. At which time the stirrer was activated and the reactor temperature increased to 470° F. With continued stirring NDA (450 g) was added in two portions of 225 g each via a purged addition hopper. The reactor was sealed, and pressurized to 30 psig. While maintaining the melt temperature at 500° F., ethylene glycol was fed to the reactor at a rate 142.1 grams per hour for a period of one hour. During the ethylene glycol feed cycle water began to distill from the reactor. The temperature and pressure of the reactor were maintained until the production of water halted as indicated by a reduction in column overhead temperature of greater than 4° F. Following this period the pressure of the reactor was reduced in a controlled manner to atmospheric pressure. The reactor was maintained at 500° F. for an additional 25 minutes at which time one half the contents of the reactor was discharged via the bottom port of the reactor. While maintaining the reactor temperature at 500° F. two additional NDA and EG feed cycles were performed. Following the third NDA/ethylene glycol feed cycle polyphosphoric acid (0.186 g; 80 ppm P), and antimony(III) oxide (0.18 g; 167 ppm Sb) were added to the mixture. The reactor was resealed. The pressure was reduced by means of a ramping controller at the rate of 13.2 mm Hg/min to an ultimate vacuum of to 0.50 torr. The melt temperature was simultaneously increased to 550° F. at a rate of 1 F°/min. The polymerization was maintained at these conditions until a torque target of 100 in.lbs was observed on the reactor stirrer at 10 RPM. The polymer was recovered by extruding a strand from the reactor and quenching in an ice water bath. The resulting polymer had the following properties: Tg=123.9° C., Tm 262.7° C., IV=0.50, L*=86.0, a*=−1.89, b*=9.3.

EXAMPLE 4

A two liter reactor was charged with PEN prepolymer (450 g). The reactor was heated to 360° F. and maintained at that temperature until the prepolymer was melted. At which time the stirrer was activated and the reactor temperature increased to 470° F. With continued stirring NDA (450 g) was added in two portions of 225 g each via a purged addition hopper. The reactor was sealed, and pressurized to 30 psig. While maintaining the melt temperature at 500° F., ethylene glycol containing 0.01 wt % choline was fed to the reactor at a rate 180.9 grams per hour for a period of one hour. During the ethylene glycol feed cycle water began to distill from the reactor. The temperature and pressure of the reactor were maintained until the production of water halted as indicated by a reduction in column overhead temperature of greater than 4° F. Following this period the pressure of the reactor was reduced in a controlled manner to atmospheric pressure. The reactor was maintained at 500° F. for an additional 25 minutes at which time one half the contents of the reactor was discharged via the bottom port of the reactor. While maintaining the reactor temperature at 500° F. two additional NDA and EG feed cycles were performed. Following the third NDA/ethylene glycol feed cycle polyphosphoric acid (0.186 g; 80 ppm P), and antimony(III) oxide (0.18 g; 167 ppm Sb) were added to the mixture. The reactor was resealed. The pressure was reduced by means of a ramping controller at the rate of 13.2 mm Hg/min to an ultimate vacuum of to 0.50 torr. The melt temperature was simultaneously increased to 550° F. at a rate of 1 F°/min. The polymerization was maintained at these conditions until a torque target of 100 in.lbs was observed on the reactor stirrer at 10 RPM. The polymer was recovered by extruding a strand from the reactor and quenching in an ice water bath. The resulting polymer had the following properties: Tg=123.7, °C. Tm 262.7° C., IV=0.50, L*=86.2, a*=−1.76, b*=9.3.

EXAMPLE 5

A two liter reactor was charged with PEN prepolymer (450 g). The reactor was heated to 360° F. and maintained at that temperature until the prepolymer was melted. At which time the stirrer was activated and the reactor temperature increased to 470° F. With continued stirring NDA (450 g) was added in two portions of 225 g each via a purged addition hopper. The reactor was sealed, and pressurized to 30 psig. While maintaining the melt temperature at 500° F., ethylene glycol containing 0.01 weight percent choline was fed to the reactor at a rate 155.0 grams per hour for a period of one hour. During the ethylene glycol feed cycle water began to distill from the reactor. The temperature and pressure of the reactor were maintained until the production of water halted as indicated by a reduction in column overhead temperature of greater than 4 F. Following this period the pressure of the reactor was reduced in a controlled manner to atmospheric pressure. The reactor was maintained at 500° F. for an additional 25 minutes at which time one half the contents of the reactor was discharged via the bottom port of the reactor. While maintaining the reactor temperature at 500° F. two additional NDA and EG feed cycles were performed. Following the third NDA/ethylene glycol feed cycle polyphosphoric acid (0.186 g; 80 ppm P), and antimony(III) oxide (0.18 g; 167 ppm Sb) were added to the mixture. The reactor was resealed. The pressure was reduced by means of a ramping controller at the rate of 13.2 mm Hg/min to an ultimate vacuum of to 0.50 torr. The melt temperature was simultaneously increased to 550° F. at a rate of 1° F./min. The polymerization was maintained at these conditions, however the torque target of 100 in.lbs at 10 RPM was never reached.

EXAMPLE 6

A two liter reactor was charged with PEN prepolymer (450 g). the reactor was heated to 360° F. and maintained at that temperature until the prepolymer was melted. At which time the stirrer was activated and the reactor temperature increased to 470° F. With continued stirring NDA (450 g) was added in two portions of 225 g each via purged addition hopper. The reactor was sealed, and pressurized to 30 psig. While maintaining the melt temperature at 500° F., ethylene glycol containing 0.01 weight percent choline was fed to the reactor at a rate 142.1 grams per hour for a period of one hour. During the ethylene glycol feed cycle water began to distill from the reactor. The temperature and pressure of the reactor were maintained until the production of water halted as indicated by a reduction in column overhead temperature of greater than 4° F. Following this period the pressure of the reactor was reduced in a controlled manner to atmospheric pressure. The reactor was maintained at 500° F. for an additional 25 minutes at which time one half the contents of the reactor was discharged via the bottom port of the reactor. While maintaining the reactor temperature at 500° F. two additional NDA and EG feed cycles were performed. Following the third NDA/ethylene glycol feed cycle polyphosphoric acid (0.186 g; 80 ppm P), and antimony(III) oxide (0.18 g; 167 ppm Sb) were added to the mixture. The reactor was resealed. The pressure was reduced by means of a ramping controller at the rate of 13.2 mm Hg/min to an ultimate vacuum of to 0.50 torr. The melt temperature was simultaneously increased to 550° F. at a rate of 1° F./min. The polymerization was maintained at these conditions however the torque target of 100 in.lbs at 10 RPM was never reached.

COMPARATIVE EXAMPLE 1

A one gallon reactor was charged with NDA (1016.4 g), choline (2 drops), and EG (583.6 g). The final EG/NDA ratio was 2. The reactor was sealed, pressurized to 63 psig, and heated to 545° F. for approximately 250 minutes. Following this initial period the pressure of the reactor was reduced to atmospheric. While maintaining the temperature at 545° F. polyphosphoric acid (0.049 g), and antimony tris 2 ethyl hexanoate (3 mL). were added to the mixture. The reactor was resealed and the pressure reduced to 0.40 torr over the next 235 minutes. Following this the polymer was recovered by extruding a strand from the reactor and quenching in an ice water bath. The resulting polymer had the following properties: Tg=68° C., IV=0.27, L*=99.38. a*=0.30, b*=0.21.

COMPARATIVE EXAMPLE 2

A one gallon reactor was charged with PEN prepolymer (500 g), EG (138 g), and cobalt and manganese acetate (83 ppm Co, 193 ppm Mn). The reactor was heated to 380° F. and with stirring NDA (300 g) was added slowly over a 15 minute period. The final EG/NDA ratio was 1.6. The reactor was sealed, pressurized to 50 psig, and heated to 515° F. for 100 min. During this time water distilled from the reactor. The reactor was depressurized and purged with nitrogen. The product prepolymer was drained into stainless steel container cooled by dry ice and blanketed with carbon dioxide. The prepolymer recovered (802 g) was ground sufficiently small to be used in subsequent experiments.

COMPARATIVE EXAMPLE 3

A one gallon reactor was charged with PEN prepolymer (500 g), EG (138 g), and cobalt and manganese acetate (62 ppm Co, 144 ppm Mn). The reactor was heated to 380° F. and with stirring NDA (400 g) was added over a 15 minute period. The final EG/NDA ratio was 1.2. The reactor was sealed, pressurized to 50 psig, and heated to 515° F. for 100 min. Following this initial period the pressure of the reactor was reduced in a stepwise fashion to atmospheric over a 60 minute period, and held at atmospheric pressure for 30 minutes. Following this, the reactor was purged with nitrogen (1.5 scfh) for 60 minutes. During this time water distilled from the reactor. The product prepolymer was drained into stainless steel container cooled by dry ice and blanketed with carbon dioxide. The prepolymer recovered (895 g) was ground sufficiently small to be used in subsequent experiments.

COMPARATIVE EXAMPLE 4

A one gallon reactor was charged with PEN prepolymer (500 g), EG (210 g), and cobalt and manganese acetate (50 ppm Co, 116 ppm Mn). The reactor was heated to 380° F. and with stirring NDA (500 g) was added over a 15 minute period. The final EG/NDA ratio was 1.5. The reactor was sealed, pressurized to 50 psig, and heated to 515° F. for 100 min. Following this initial period the pressure of the reactor was reduced in a stepwise fashion to atmospheric over a 60 minute period, and held at atmospheric pressure for 30 minutes. Following this, the reactor was purged with nitrogen (1.5 scfh) for 60 minutes. During this time water distilled from the reactor. The product prepolymer was drained into stainless steel container cooled by dry ice and blanketed with carbon dioxide. The prepolymer recovered was ground sufficiently small to be used in subsequent experiments.

COMPARATIVE EXAMPLE 5

A one gallon reactor was charged with PEN prepolymer (400 g), EG (257 g), and cobalt and manganese acetate (41 ppm Co, 96 ppm Mn). The reactor was heated to 380° F. and with stirring NDA (600 g) was added over a 15 minute period. The final EG/NDA ratio was 1.5. The reactor was sealed, pressurized to 50 psig, and heated to 515° F. for 100 min. Following this initial period the pressure of the reactor was reduced in a stepwise fashion to atmospheric over a 60 minute period, and held at atmospheric pressure for 30 minutes. Following this, the reactor was purged with nitrogen (1.5 scfh) for 60 minutes. During this time water distilled from the reactor. The product prepolymer was drained into stainless steel container cooled by dry ice and blanketed with carbon dioxide. The prepolymer recovered was ground sufficiently small to be used in subsequent experiments.

COMPARATIVE EXAMPLE 6

A one gallon reactor was charged with PEN prepolymer (300 g), EG (285 g), and cobalt and manganese acetate (35 ppm Co, 83 ppm Mn). The reactor was heated to 380° F. and with stirring NDA (700 g) was added over a 15 minute period. The final EG/NDA ratio was 1.4. The reactor was sealed, pressurized to 50 psig, and heated to 515° F. for 140 min. Following this initial period the pressure of the reactor was reduced in a stepwise fashion to atmospheric over a 25 minute period. Following this, the reactor was purged with nitrogen (1.5 scfh) and the temperature was increased to 555° F. over a 60 minute period. Being careful to maintain a nitrogen blanket on the reaction mixture, polyphosphoric acid (0.179 g; 99 ppm P), and antimony(III) oxide (0.247 g; 295 ppm Sb) were added to the mixture. The reactor was resealed and the pressure reduced to 0.40 torr over the next 200 minutes. Following this the polymer was recovered by extruding a strand from the reactor and quenching in an ice water bath. The resulting polymer had the following properties: Tg=107° C., Tm ND, IV=0.64, L*=88.35, a*=−0.92, b*=5.20

COMPARATIVE EXAMPLE 7

A one gallon reactor was charged with PEN prepolymer (300 g), EG (241 g), and cobalt and manganese acetate (35 ppm Co, 83 ppm Mn). The reactor was heated to 380° F. and with stirring NDA (700 g) was added over a 15 minute period. The final EG/NDA ratio was 1.2. The reactor was sealed, pressurized to 50 psig, and heated to 515° F. for approximately 110 minutes. Following this initial period the pressure of the reactor was reduced in a stepwise fashion to atmospheric over approximately 50 minutes. Following this, the reactor was purged with nitrogen (1.5 scfh) for approximately 70 minutes. This esterification procedure was performed 4 times. The first three times the prepolymer from the previous run was used in the reactor charge. On the fourth time, rather than maintaining the temperature at 515° F. during the nitrogen purge, the temperature was increased to 555° F. over this period. Being careful to maintain a nitrogen blanket on the reaction mixture, polyphosphoric acid (0.179 g; 99 ppm P), and antimony(III) oxide (0.247 g; 295 ppm Sb) were added to the mixture. The reactor was resealed and the pressure reduced to 0.40 torr over the next 200 minutes. Following this the polymer was recovered by extruding a strand from the reactor and quenching in an ice water bath. The resulting polymer had the following properties: IV=0.24, no other properties were determined.

COMPARATIVE EXAMPLE 8

A one gallon reactor was charged with PEN prepolymer (300 g), EG (261 g), and cobalt and manganese acetate (35 ppm Co, 83 ppm Mn). The reactor was heated to 380° F. and with stirring NDA (700 g) was added over a 15 minute period. The final EG/NDA ratio was 1.3. The reactor was sealed, pressurized to 50 psig, and heated to 515° F. for approximately 110 minutes. Following this initial period the pressure of the reactor was reduced in a stepwise fashion to atmospheric over approximately 50 minutes. Following this, the reactor was purged with nitrogen (1.5 scfh) for approximately 70 minutes. This esterification procedure was performed 4 times. The first three times the prepolymer from the previous run was used in the reactor charge. On the fourth time, rather than maintaining the temperature at 515° F. during the nitrogen purge, the temperature was increased to 555° F. over this period. Being careful to maintain a nitrogen blanket on the reaction mixture, polyphosphoric acid (0.179 g; 99 ppm P), and antimony(III) oxide (0.247 g; 295 ppm Sb) were added to the mixture. The reactor was resealed and the pressure reduced to 0.40 torr over the next 200 minutes. Following this the polymer was recovered by extruding a strand from the reactor and quenching in an ice water bath. The resulting polymer had the following properties: Tg=105° C., Tm ND, IV=0.56, L*=88.49.a*=−0.86, b*=5.90.

COMPARATIVE EXAMPLE 9

A one gallon reactor was charged with PEN prepolymer (300 g), EG (251 g), and cobalt and manganese acetate (35 ppm Co, 83 ppm Mn). The reactor was heated to 380° F. and with stirring NDA (700 g) was added over a 15 minute period. The final EG/NDA ratio was 1.25. The reactor was sealed, pressurized to 50 psig, and heated to 515° F. for approximately 110 minutes. Following this initial period the pressure of the reactor was reduced in a stepwise fashion to atmospheric over approximately 50 minutes. Following this, the reactor was purged with nitrogen (1.5 scfh) for approximately 70 minutes. This esterification procedure was performed 4 times. The first three times the prepolymer from the previous run was used in the reactor charge. On the fourth time, rather than maintaining the temperature at 515° F. during the nitrogen purge, the temperature was in creased to 555° F. over this period. Being careful to maintain a nitrogen blanket on the reaction mixture, polyphosphoric acid (0.179 g; 99 ppm P), and antimony(III) oxide (0.247 g; 295 ppm Sb) were added to the mixture. The reactor was resealed and the pressure reduced to 0.40 torr over the next 200 minutes. Following this the polymer was recovered by extruding a strand from the reactor and quenching in an ice water bath. The resulting polymer had the following properties: Tg=105, Tm 239, IV=0.41, L*=88.38.a*=−0.87, b*=4.75.

That which is claimed is:

1. A process of preparing a high quality linear polyester resin which comprises reacting in a first step or zone 2,6-naphthalene dicarboxylic acid with a molten prepolymer derived from a glycol and 2,6-naphthalene dicarboxylic acid to form a low molecular weight product of the first step or zone; reacting the resultant product with a glycol in at least two successive steps or zones of glycol addition to form prepolymer; and polymerizing at least a portion of the resulting prepolymer to form polyester resin which exhibits midpoint glass transition temperatures above about 123° C.

2. The process of preparing high quality linear polyester resin according to claim 1 wherein at least a portion of the prepolymer is returned to the first step or zone.

3. The process of preparing high quality linear polyester resin according to claim 1 wherein the prepolymer is formed in a substantial absence of catalyst and/or ether suppressant.

4. The process of preparing high quality linear polyester resin according to claim 3 wherein the prepolymer is formed at temperatures in a range of from about 190° C. to about 320° C.

5. The process of preparing high quality linear polyester resin according to claim 3 wherein at least a portion of an effluent form one or more of the steps or zones of glycol addition is returned to the first step or zone.

6. The process of preparing high quality linear polyester resin according to claim 3 wherein the prepolymer is formed from at least one glycol selected from the group consisting of 1,2-ethanediol and 1,4-butanediol at temperatures in a range of from about 200° C. to about 300° C.

7. The process of preparing high quality linear polyester resin according to claim 3 wherein the glycol is 1,2-ethanediol and the poly(ethylene-2,6-naphthalate) resin formed exhibits midpoint glass transition temperatures in a range upward from about 124° C.

8. A process of preparing a high quality linear polyester resin which comprises:
(A) reacting in a first step or zone 2,6-naphthalene dicarboxylic acid with a molten hydroxyl-ended prepolymer derived from a glycol and 2,6-naphthalene dicarboxylic acid at temperatures in a range of from about 190° C. to about 320° C. to form a resulting carboxyl-ended prepolymer;

(B) reacting the carboxyl-ended prepolymer with a glycol in at least two successive steps or zones at temperatures in a range of from about 180° C. to about 330° C. to form a hydroxyl-ended prepolymer;

(C) partitioning the resulting hydroxyl-ended prepolymer into a condensation fraction and at least one recycle fraction of the hydroxyl-ended prepolymer;

(D) returning one of the recycle fractions of hydroxyl-ended prepolymer to the first step or zone; and (E) polymerizing in a polycondensation step or zone at least a portion of the condensation fraction of hydroxyl-ended prepolymer to form polyester resin which exhibits midpoint glass transition temperatures above about 123° C.

9. The process of preparing high quality linear polyester resin according to claim 8 wherein the hydroxyl-ended prepolymer is formed in a substantial absence of catalyst and/or ether suppressant.

10. The process of preparing high quality linear polyester resin according to claim 9 wherein the glycol is 1,2-ethanediol and the poly(ethylene-2,6-naphthalate) resin formed exhibits midpoint glass transition temperatures in a range upward from about 124° C.

11. The process of preparing high quality linear polyester resin according to claim 8 wherein an amount of the recycle fraction of hydroxyl-ended prepolymer returned to the first step or zone is in a range of from about 25 percent to up to about 55 percent of the sum of the condensation fraction and all recycle fractions of hydroxyl-ended prepolymer.

12. The process of preparing high quality linear polyester resin according to claim 8 further comprising:

(D₁) recovering unreacted glycol from at least a portion of the condensation fraction of hydroxyl-ended prepolymer prior to the polycondensation step or zone.

13. The process of preparing high quality linear polyester resin according to claim 11 wherein the hydroxyl-ended prepolymer is formed from at least one glycol selected from the group consisting of 1,2-ethanediol and 1,4-butanediol at temperatures in a range of from about 200° C. to about 300° C.

14. A process of preparing a high quality linear polyester resin which comprises;

(A) reacting in a first step or zone about 10 parts by weight of 2,6-naphthalene dicarboxylic acid with from about 1 part to about 100 parts by weight of a molten hydroxyl-ended prepolymer derived from 2,6-naphthalene dicarboxylic acid and a glycol to form a resulting product comprising acid modified prepolymer;

(B) reacting in at least two successive steps or zones the acid modified prepolymer of the first step or zone with the glycol to form a product comprising hydroxyl-ended prepolymer;

(C) partitioning the resulting prepolymer into a condensation fraction and a recycle fraction of the hydroxyl-ended prepolymer;

(D) returning the recycle fraction to the first step or zone; and (E) polymerizing in a polycondensation step or zone the condensation fraction of hydroxyl-ended prepolymer to form polyester resin which exhibits midpoint glass transition temperatures above about 124° C.

15. The process of preparing high quality linear polyester resin according to claim 14 wherein the total amounts of glycol used to form the hydroxyl-ended prepolymer provide in a range of from about 1 to about 10 moles of glycol per mole of 2,6-naphthalene dicarboxylic acid.

16. The process of preparing high quality linear polyester resin according to claim 15 wherein the glycol is 1,2-ethanediol and the poly(ethylene-2,6-naphthalate) resin formed exhibits midpoint glass transition temperatures in a range upward from about 124° C.

17. The process of preparing high quality linear polyester resin according to claim 14 wherein an amount of the recycle fraction of hydroxyl-ended prepolymer returned to the first step or zone is in a range of from about 25 percent to up to about 55 percent of the sum of the condensation fraction and recycle fraction of hydroxyl-ended prepolymer.

18. The process of preparing high quality linear polyester resin according to claim 17 wherein the hydroxyl-ended prepolymer is formed in a substantial absence of catalyst and/or ether suppressant.

19. The process of preparing high quality linear polyester resin according to claim 18 further comprising:

(D₁) recovering unreacted glycol from at least a portion of the condensation fraction of hydroxyl-ended prepolymer prior to the polycondensation step or zone.

20. The process of preparing high quality linear polyester resin according to claim 19 wherein the glycol is 1,2-ethanediol and the poly(ethylene-2,6-naphthalate) resin formed exhibits midpoint glass transition temperatures in a range upward from about 125° C.

* * * * *

UNITED STATES PATENT AND TRADEMARK OFFICE
CERTIFICATE OF CORRECTION

PATENT NO. : 5,331,082
DATED : Jul. 19, 1994
INVENTOR(S) : Allen B. Mossman, et al It is certified that error appears in the above-indentified patent and that said Letters Patent is hereby corrected as shown below:

| Col. | Line | |
|---|---|---|
| 6 | 39 | "L*= -1.98, b*= 8.88." should read --L*= 86.4, a*= -1.98, b*= 8.88.-- |
| 6 | 68 | "The reactor was released." should read --The reactor was resealed.-- |

Signed and Sealed this

Thirtieth Day of January, 1996

Attest:

BRUCE LEHMAN

Attesting Officer

Commissioner of Patents and Trademarks